(12) United States Patent
Yatagawa et al.

(10) Patent No.: US 11,688,559 B2
(45) Date of Patent: Jun. 27, 2023

(54) MULTILAYER CERAMIC CAPACITOR HAVING EXTERNAL ELECTRODES PROVIDED WITH FLUORINE COMPOUND

(71) Applicant: TAIYO YUDEN CO., LTD., Tokyo (JP)

(72) Inventors: Kiyoshiro Yatagawa, Takasaki (JP); Satoshi Kobayashi, Takasaki (JP); Takahisa Fukuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 38 days.

(21) Appl. No.: 16/828,786

(22) Filed: Mar. 24, 2020

(65) Prior Publication Data
US 2020/0312571 A1 Oct. 1, 2020

(30) Foreign Application Priority Data

Mar. 28, 2019 (JP) ................................. 2019-064669
Jan. 9, 2020 (JP) ................................. 2020-002420

(51) Int. Cl.
*H01G 4/30* (2006.01)
*H01G 4/012* (2006.01)
(Continued)

(52) U.S. Cl.
CPC .............. *H01G 4/30* (2013.01); *H01G 4/012* (2013.01); *H01G 4/1209* (2013.01); *H01G 4/248* (2013.01)

(58) Field of Classification Search
CPC ............ H01G 4/30; H01G 4/005; H01G 4/14; H01G 4/224; H01G 4/248; H01G 4/252; H01G 4/012
See application file for complete search history.

(56) References Cited

U.S. PATENT DOCUMENTS

| 6,903,919 | B2 * | 6/2005 | Kayatani | ................ | H01G 2/103 |
| | | | | | 361/321.2 |
| 7,304,831 | B2 * | 12/2007 | Yoshii | .................. | H01G 4/2325 |
| | | | | | 361/306.1 |
| 9,881,741 | B2 * | 1/2018 | Otani | .................... | H01F 27/292 |

(Continued)

FOREIGN PATENT DOCUMENTS

EP 0501933 A2 9/1992
JP 2012004544 A 1/2012
(Continued)

OTHER PUBLICATIONS

Shiow-Ching Lin and Bradley Kent, "Flammability of Polymers", ACS (2009). Fire and Polymers V, pp. 288-290 (Year: 2009).*

*Primary Examiner* — David M Sinclair
*Assistant Examiner* — Daniel M Dubuisson
(74) *Attorney, Agent, or Firm* — Law Office of Katsuhiro Arai

(57) ABSTRACT

A multilayer ceramic capacitor includes: a multilayer chip in which each of dielectric layers and each of internal electrode layers are stacked, the plurality of internal electrode layers being exposed to at least one of a first end face and a second end face of the multilayer structure, the first end face being opposite to the second end face, a first external electrode provided on the first end face; a second external electrode provided on the second end face; and a fluorine compound that is adhered to at least a part of a region including a surface of the multilayer chip where neither the first external electrode nor the second external electrode is formed and surfaces of the first external electrode and the second external electrode, fluorine compound being released at a temperature of 380 degrees C. or more.

17 Claims, 10 Drawing Sheets

(51) Int. Cl.
*H01G 4/12* (2006.01)
*H01G 4/248* (2006.01)

(56) References Cited

U.S. PATENT DOCUMENTS

| | | | |
|---|---|---|---|
| 10,395,840 B1* | 8/2019 | Park | H01G 2/065 |
| 2011/0013343 A1* | 1/2011 | Koh | H01G 4/14 |
| | | | 361/323 |
| 2011/0249374 A1* | 10/2011 | Yokotani | C09D 127/16 |
| | | | 361/524 |
| 2011/0287176 A1 | 11/2011 | Saito et al. | |
| 2013/0057112 A1* | 3/2013 | Shirakawa | H01C 1/148 |
| | | | 310/311 |
| 2015/0287532 A1* | 10/2015 | Abe | H01G 4/2325 |
| | | | 174/260 |
| 2016/0024346 A1* | 1/2016 | Inoue | H01C 17/281 |
| | | | 361/301.4 |
| 2016/0027561 A1* | 1/2016 | Inoue | H01C 7/1006 |
| | | | 338/20 |
| 2016/0027585 A1* | 1/2016 | Inoue | H01G 13/006 |
| | | | 361/301.4 |
| 2016/0172110 A1 | 6/2016 | Otani | |
| 2016/0314901 A1* | 10/2016 | Lazarev | H01G 4/18 |
| 2017/0011852 A1* | 1/2017 | Miyazaki | H01G 4/2325 |
| 2017/0069428 A1* | 3/2017 | Shimizu | H01G 4/232 |
| 2017/0256359 A1* | 9/2017 | Masunari | H01G 4/30 |
| 2019/0148070 A1 | 5/2019 | Kobayashi et al. | |
| 2019/0392991 A1* | 12/2019 | Harada | H01G 4/232 |

FOREIGN PATENT DOCUMENTS

| | | |
|---|---|---|
| JP | 2016063008 A | 4/2016 |
| JP | 2016115918 A | 6/2016 |
| JP | 2019091813 A | 6/2019 |
| KR | 20190019793 A * | 2/2019 |

* cited by examiner

MULTILAYER CERAMIC CAPACITOR HAVING EXTERNAL ELECTRODES PROVIDED WITH FLUORINE COMPOUND

CROSS-REFERENCE TO RELATED APPLICATION

This application is based upon and claims the benefit of priority of the prior Japanese Patent Application Publication No. 2019-064669, filed on Mar. 28, 2019 and Japanese Patent Application No. 2020-002420, filed on Jan. 9, 2020, the entire contents of which are incorporated herein by reference.

FIELD

A certain aspect of the present invention relates to a multilayer ceramic capacitor and a manufacturing method of the multilayer ceramic capacitor.

BACKGROUND

For example, an external electrode of a ceramic electronic device such as a multilayer ceramic capacitor has a conductive resin layer in which a metal component and resin are mixed, in order to suppress stress when mounting the ceramic electronic device on a substrate (for example, see Japanese Patent Application Publication No. 2016-63008).

SUMMARY OF THE INVENTION

When the ceramic electronic device is used in high-temperature and high-humidity condition, the metal component of the conductive resin layer may diffuse because of water adhered to a surface of the ceramic electronic device. In this case, reliability of the ceramic electronic device may be degraded. Even if the external electrode does not have the conductive resin layer, a metal component of the external electrode may diffuse and the reliability may be degraded.

The present invention has a purpose of providing a multilayer ceramic capacitor and a manufacturing method of the multilayer ceramic capacitor that are capable of improving reliability of the multilayer ceramic capacitor.

According to an aspect of the present invention, there is provided a multilayer ceramic capacitor including: a multilayer chip in which each of a plurality of dielectric layers and each of a plurality of internal electrode layers are stacked, a main component of the dielectric layers being ceramic, the multilayer chip having a rectangular parallelepiped shape, respective of one ends of the plurality of internal electrode layers being exposed to at least one of a first end face and a second end face of the multilayer structure, the first end face being opposite to the second end face, a first external electrode provided on the first end face; a second external electrode provided on the second end face; and a fluorine compound that is adhered to at least a part of a region including a surface of the multilayer chip where neither the first external electrode nor the second external electrode is formed and surfaces of the first external electrode and the second external electrode, the fluorine compound being released at a temperature of 380 degrees C. or more.

According to another aspect of the present invention, there is provided a manufacturing method of a multilayer ceramic capacitor including: preparing a multilayer ceramic capacitor having a multilayer chip, a first external electrode and a second external electrode, bonding a fluorine compound which is released at a temperature of 380 degrees C. or more to at least a part of a region including a surface of the multilayer chip where neither the first external electrode nor the second external electrode is formed and surfaces of the first external electrode and the second external electrode, by contacting heated fluorine rubber to the region, wherein the multilayer chip has a structure in which each of a plurality of dielectric layers and each of a plurality of internal electrode layers are stacked, a main component of the dielectric layers being ceramic, the multilayer structure having a rectangular parallelepiped shape, respective one ends of the plurality of internal electrode layers being exposed to at least one of a first end face and a second end face of the multilayer structure, the first end face being opposite to the second end face, wherein the first external electrode is provided on the first end face, wherein the second external electrode is provided on the second end face.

DETAILED DESCRIPTION

A description will be given of an embodiment with reference to the accompanying drawings.

Embodiment

Figure 1:
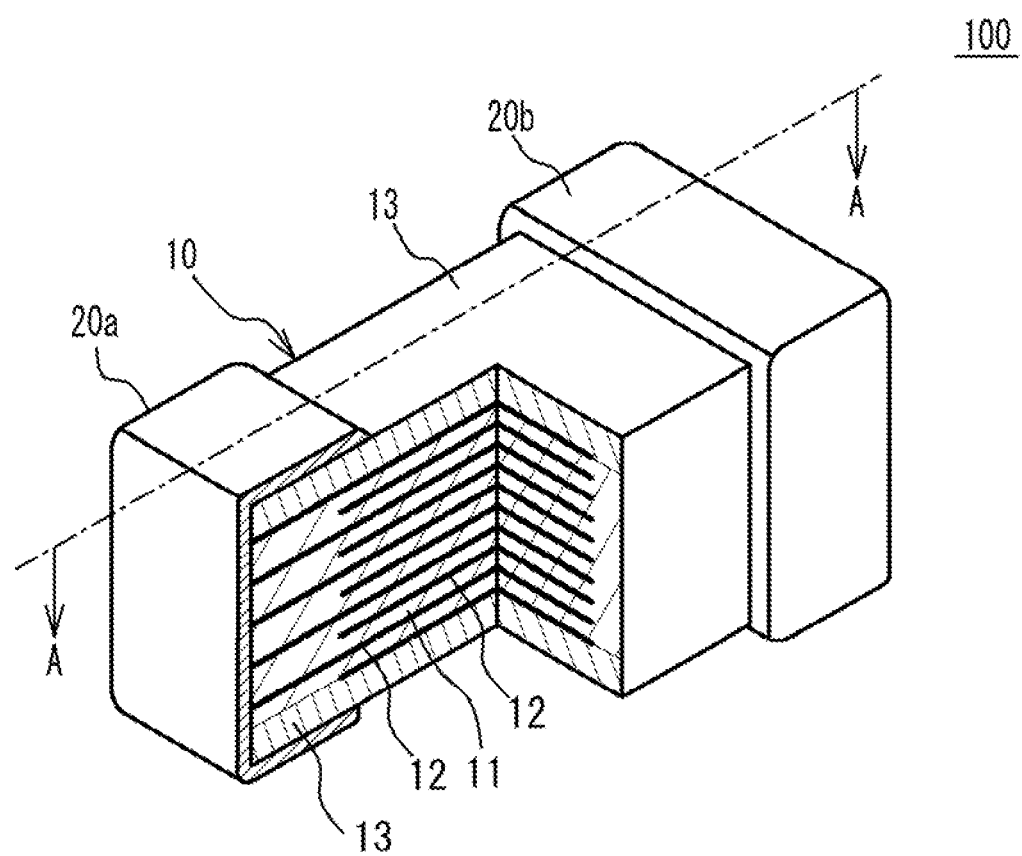
FIG. 1 illustrates a perspective view of a multilayer ceramic capacitor in which a cross section of a part of the multilayer ceramic capacitor is illustrated.

A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
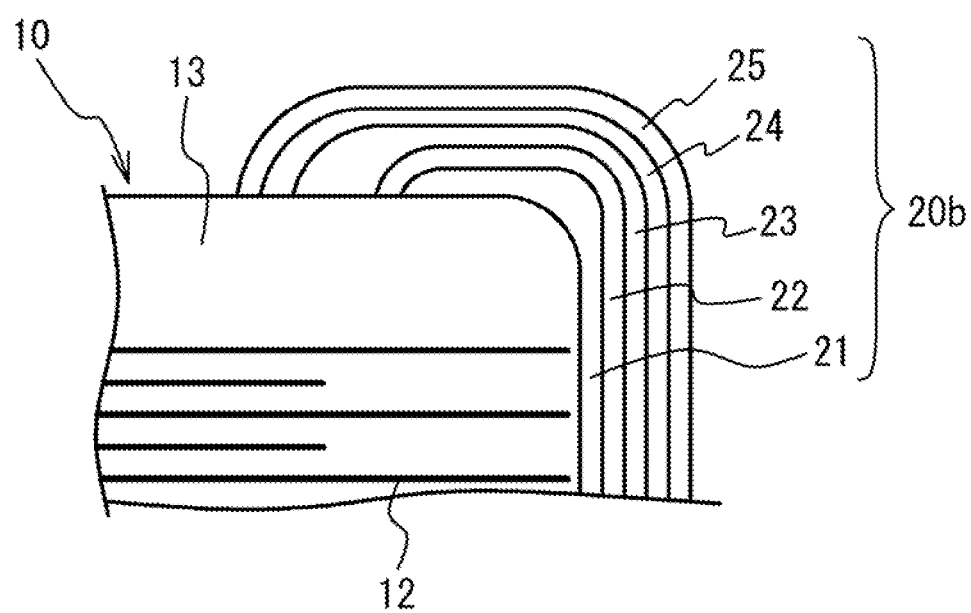
FIG. 2 illustrates a cross sectional view of an external electrode and is a partial cross sectional view taken along a line A-A of FIG. 1.

FIG. 2 illustrates a cross sectional view of the external electrode 20b and is a partial cross sectional view taken along a line A-A of FIG. 1. In FIG. 2, hatching for cross section is omitted. As illustrated in FIG. 2, the external electrode 20b has a structure in which a first plated layer 22 such as Cu, a conductive resin layer 23, a second plated layer 24 such as Ni and a third plated layer 25 such as Sn are formed on a ground layer 21 in this order. The ground layer 21, the first plated layer 22, the conductive resin layer 23, the second plated layer 24 and the third plated layer 25 extend toward the two side faces, the upper face and the lower face of the multilayer chip 10 from the both end faces of the multilayer chip 10.

A main component of the ground layer 21 is a metal such as Cu, Ni, Al (aluminum) or Zn (zinc). The ground layer 21 includes a glass component for densifying the ground layer 21 or a co-material for controlling sinterability of the ground layer 21. The ground layer 21 including these ceramic components has high adhesiveness with the cover layer 13 whose main component is a ceramic material. The conductive resin layer 23 is a resin layer including a metal component such as Ag. The conductive resin layer 23 is flexible. Therefore, the conductive resin layer 23 suppresses stress caused by deflection of a substrate on which the multilayer ceramic capacitor 100 is mounted. The first plated layer 22 is provided in order to increase adhesiveness between the ground layer 21 and the conductive resin layer 23. The external electrode 20a has the same structure as the external electrode 20b. The conductive resin layer 23 may not be necessarily provided.

When the external electrodes 20a and 20b have the structure illustrated in FIG. 2 and the multilayer ceramic capacitor 100 is used in high-temperature and high-humidity condition, a metal component of the conductive resin layer 23 may diffuse because of water adhered to the surface of the multilayer ceramic capacitor 100. In this case, reliability of the multilayer ceramic capacitor 100 may be degraded. For example, the metal component of the conductive resin layer 23 may diffuse to the surface of the multilayer chip 10 between the external electrode 20a and the external electrode 20b (migration phenomena). Even if the external electrodes 20a and 20b do not include the conductive resin layer 23, another metal component of the external electrodes 20a and 20b may diffuse.

Figure 3:
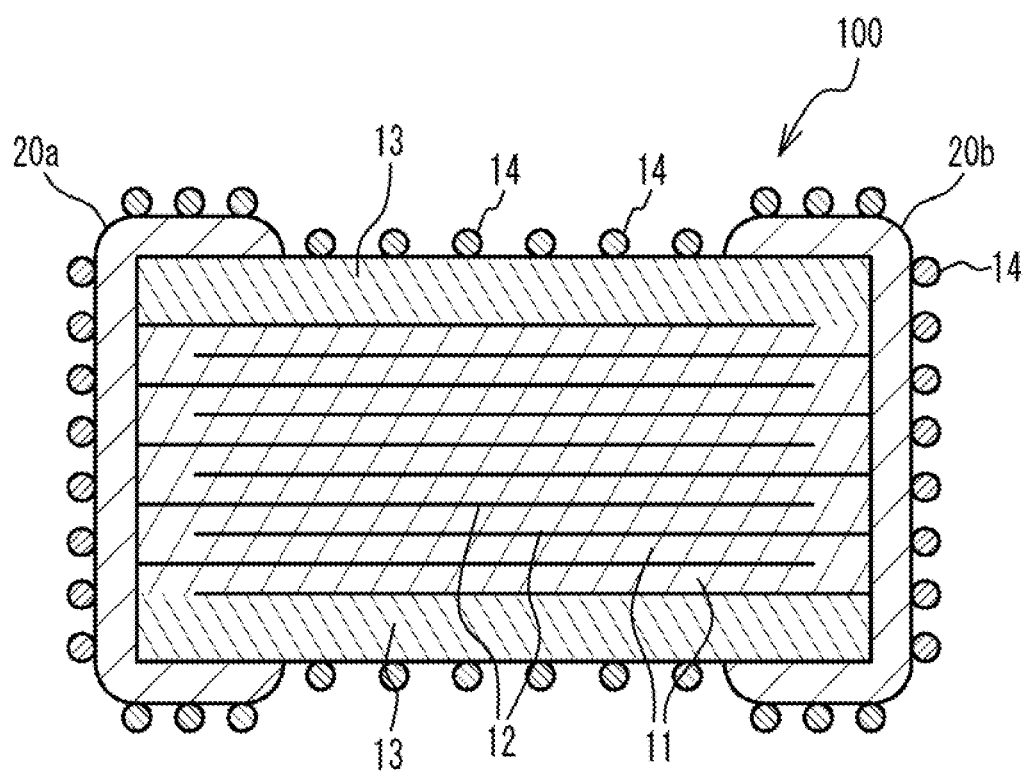
FIG. 3 illustrates a structure in which a fluorine compound is adhered to a multilayer ceramic capacitor.
Figure 4:
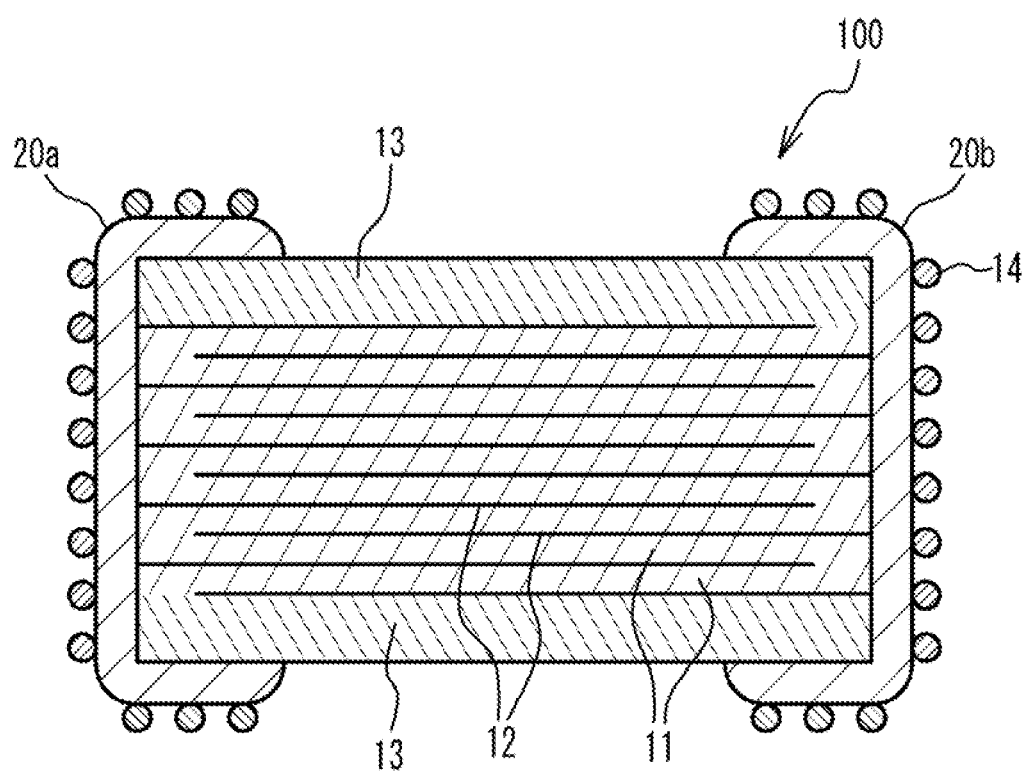
FIG. 4 illustrates a structure in which a fluorine compound is adhered to a multilayer ceramic capacitor.
Figure 5:
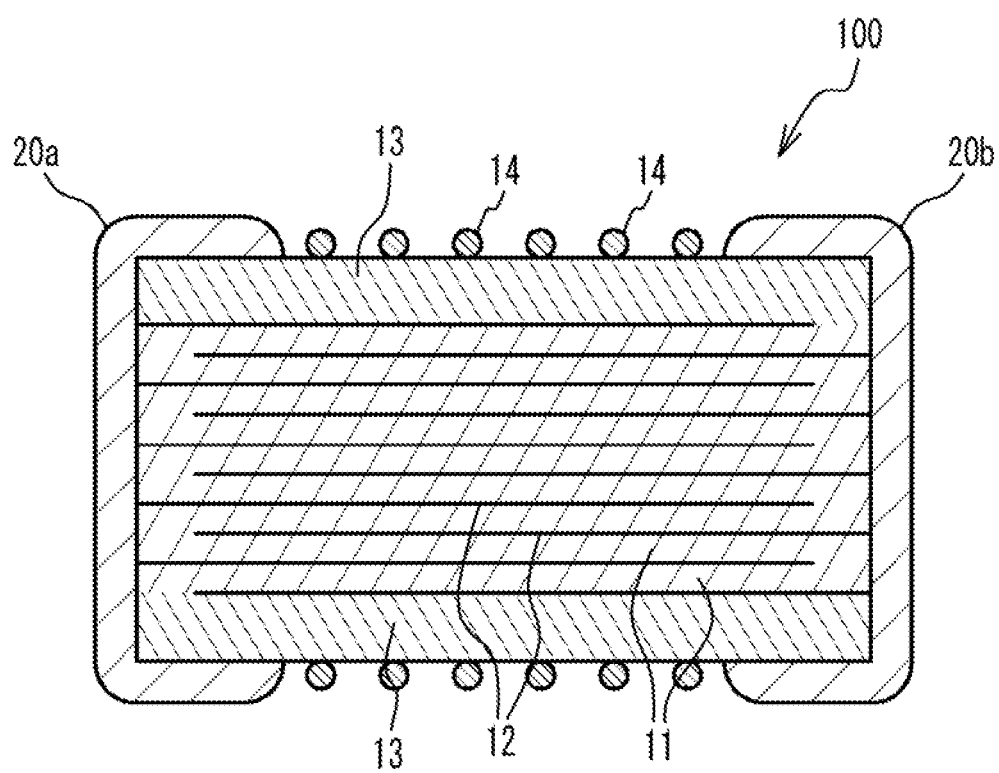
FIG. 5 illustrates a structure in which a fluorine compound is adhered to a multilayer ceramic capacitor.

And so, the multilayer ceramic capacitor 100 of the embodiment has a structure in which a fluorine compound 14 is adhered to at least a part of the surface of the multilayer ceramic capacitor 100, as illustrated in FIG. 3. The fluorine compound 14 is adhered to at least a part of a region including the surface of the multilayer chip 10 where the external electrode 20a or 20b is not formed and the surface of the surface of the external electrodes 20a and 20b. For example, as illustrated in FIG. 4, the fluorine compound 14 may be adhered to only a part of the surface of the multilayer chip 10 where the external electrode 20a or 20b is not formed. Alternatively, as illustrated in FIG. 5, the fluorine compound 14 may be adhered to only a part of the surface of the external electrodes 20a and 20b.

When the fluorine compound 14 is adhered to the surface of the multilayer ceramic capacitor 100, the fluorine compound 14 may directly contact to the surface or the fluorine compound 14 and may be adhered to the surface through another film or the like. The same thing is applied to the following description.

In the embodiment, the fluorine compound 14 is released from the surface of the multilayer ceramic capacitor 100 at a temperature which is equal to or more than 380 degrees C. The fluorine compound 14 tends to be left after mounting the multilayer ceramic capacitor 100 with solder, because the fluorine compound 14 is released at a temperature which is equal to or more than 380 degrees C. The fluorine compound 14 has water-repellent characteristic. Therefore, even if the multilayer ceramic capacitor 100 is used in high-temperature and high-humidity condition, adhesion of water to the surface of the multilayer ceramic capacitor 100 is suppressed. It is therefore possible to improve the reliability of the multilayer ceramic capacitor 100. The fluorine compound 14 contributes to improvement of the reliability, even if the fluorine compound 14 is adhered to the surface of the multilayer chip 10 where the external electrode 20a or 20b is not formed or the surface of the external electrodes 20a and 20b. It is preferable that the fluorine compound 14 is not released from the surface of the multilayer ceramic capacitor 100 at a temperature less than 380 degrees C.

The fluorine compound 14 is a compound of which a mass to charge ratio m/z is 19 in GC-MS (Gas Chromatography Mass Spectrometry) analysis. It is preferable that there is at least one peak of released amount (a local maximum value of the released amount) of the fluorine compound 14 at a temperature of 300 degrees C. or more.

Even if the fluorine compound 14 is adhered to the surface of the external electrodes 20a and 20b, degradation of wettability of the solder is suppressed. This is because the amount of the fluorine compound 14 adhered to the surface of the external electrodes 20a and 20b is small. A thickness of the fluorine compound 14 is 1 nm to 80 nm. Therefore, even if the fluorine compound 14 is adhered to the surface of the external electrodes 20a and 20b, mounting characteristic can be secured.

A region of the surface of the multilayer ceramic capacitor 100 to which the fluorine compound 14 is adhered is not limited. It is preferable that the fluorine compound 14 is adhered to at least a part of a region between the external electrode 20a and the external electrode 20b on the upper face, the lower face and the two side faces of the multilayer chip 10. This is because the adhesion of water to the surface of the multilayer chip 10 between the external electrode 20a and the external electrode 20b is suppressed, and the migration is suppressed.

Alternatively, it is preferable that the fluorine compound 14 covers the whole of the multilayer ceramic capacitor 100. This is because adhesion of water to the whole of the multilayer ceramic capacitor 100 is suppressed.

Figure 6:
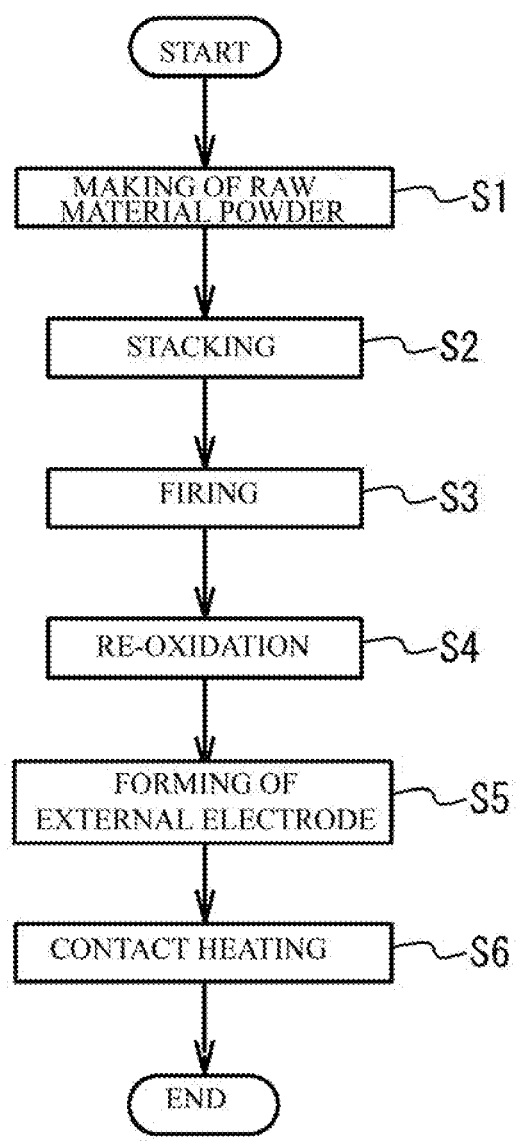
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making process of raw material powder, denoted as S1) A dielectric material for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni (nickel), Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

(Stacking process, denoted as S2) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of 0.8 μm or less is coated on a base material by, for example, a die coater method or a doctor blade method, and then dried.

Next, metal conductive paste for forming an internal electrode is provided on the surface of the dielectric green sheet by screen printing or gravure printing. The metal conductive paste includes an organic binder. Thus, a pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Then, the dielectric green sheets are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to the pair of external electrodes 20a and 20b of different polarizations. For example, a total number of the staked dielectric green sheets is 100 to 500.

After that, a cover sheet to be the cover layer 13 is cramped on the multilayer structure of the dielectric green sheets. And another cover sheet to be the cover layer 13 is cramped under the multilayer structure. Thus, a ceramic multilayer structure is obtained. After that, the binder is removed from the ceramic multilayer structure (for example, 1.0 mm×0.5 mm) in $N_2$ atmosphere of 250 degrees C. to 500 degrees C.

(Firing process, denoted as S3) The resulting compact is fired for 10 minutes to 2 hours in a reductive atmosphere having an oxygen partial pressure of $10^{-7}$ to $10^{-10}$ atm in a temperature range of 1100 degrees C. to 1300 degrees C.

(Re-oxidizing process, denoted as S4) After that, a re-oxidizing process may be performed in $N_2$ gas atmosphere in a temperature range of 600 degrees C. to 1000 degrees C.

(Forming process of external electrode, denoted as S5) Metal paste including a metal filler, a glass frit, a binder and a solvent is provided on the both end faces of the multilayer chip 10, and is dried. After that, the metal paste is baked. Thus, the ground layer 21 is formed. The binder and the solvent vaporize by the baking. In the method, it is preferable that the metal filler is Cu or the like. It is preferable that the baking is performed for 3 minutes to 30 minutes in a temperature range of 700 degrees C. to 900 degrees C. It is more preferable that the baking is performed for 5 minutes to 15 minutes in a temperature range of 760 degrees C. to 840 degrees C. After that, the first plated layer 22 may be formed on the ground layer 21 by plating.

Next, the conductive resin layer 23 is formed. For example, the conductive resin layer 23 is formed by immersion-coating thermosetting resin such as epoxy resin or phenol resin in which conductive fillers such as Ag, Ni, Cu or the like are kneaded, on the surface of the first plated layer 22, and hardening the thermosetting resin by thermal treatment. The thickness of the conductive resin layer 23 is not limited. For example, the thickness of the conductive resin layer 23 is approximately 10 μm to 50 μm. The thickness of the conductive resin layer 23 may be determined in accordance with the size of a unprocessed product. After that, the second plated layer 24 and the third plated layer 25 are formed on the conductive resin layer 23 by electroplating or the like.

(Contact heating process, denoted as S6) Next, fluorine rubber is heated to 150 degrees C. or more and is contacted to the surface of the unprocessed product. Thus, it is possible to bond the fluorine compound 14 to at least a part of the region including the region of the surface of the multilayer chip 10 where the external electrode 20a or 20b is not provided and the surface of the external electrodes 20a and 20b. In this manner, the multilayer ceramic capacitor 100 is obtained.

In the manufacturing method of the embodiment, the fluorine compound 14 which is released from the surface of the multilayer ceramic capacitor 100 at a temperature of 380 degrees C. or more is adhered to at least a part of the region including the region of the surface of the multilayer chip 10 where the external electrode 20a or 20b is not formed and the surface of the surface of the external electrodes 20a and 20b, by heating the fluorine rubber to 150 degrees C. or more and contacting the fluorine rubber to the surface of the multilayer ceramic capacitor 100. Therefore, the fluorine compound 14 tends to be left after mounting the multilayer ceramic capacitor 100 with solder. The fluorine compound 14 has water-repellent characteristic. Therefore, even if the multilayer ceramic capacitor 100 is used in high-temperature and high-humidity condition, adhesion of water to the surface of the multilayer ceramic capacitor 100 is suppressed. It is therefore possible to improve the reliability of the multilayer ceramic capacitor 100.

Figure 7:
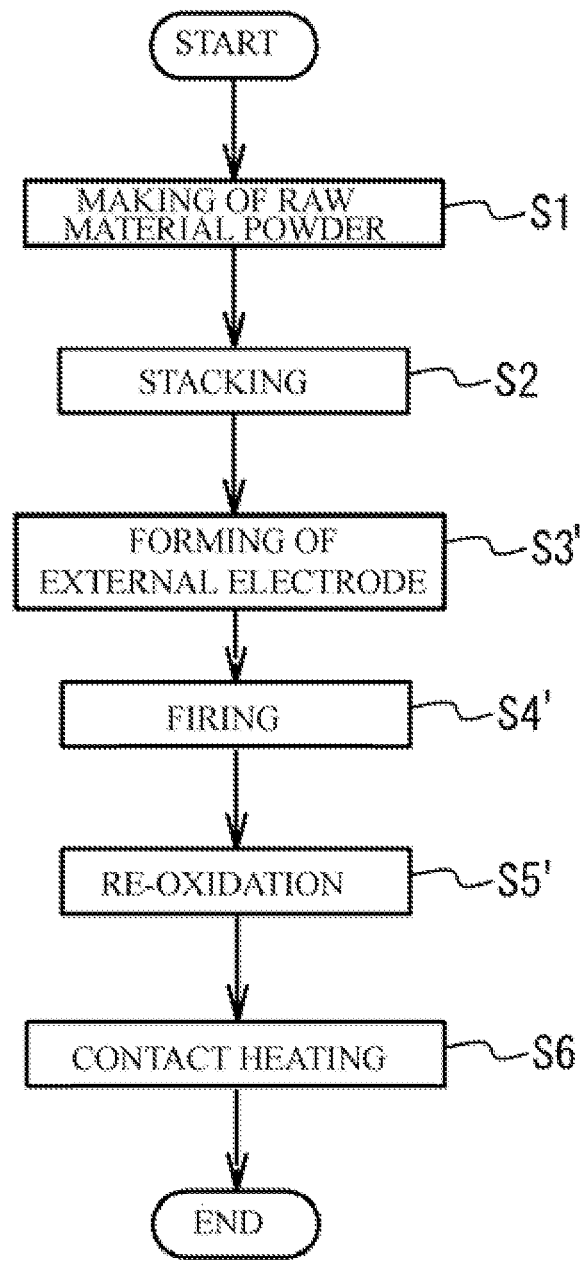
FIG. 7 illustrates a manufacturing method of a multilayer ceramic capacitor.

The ground layer 21 may be fired together with the multilayer chip 10. In this case, as illustrated in FIG. 7 (S1, S2, and S6 correspond to those in FIG. 6), in step S3a', the binder is removed from the ceramic multilayer structure in $N_2$ atmosphere of 250 degrees C. to 500 degrees C. Also, in step S3', after the above, metal paste including a metal filler, a co-material, a binder and a solvent is provided on the both end faces of the ceramic multilayer structure by a dipping method or the like and is dried. After that, in step S4', the metal paste is fired together with the ceramic multilayer structure. Firing condition is described in the above-mentioned firing process. After that, in step S5', a re-oxidizing process may be performed in $N_2$ gas atmosphere in a temperature range of 600 degrees C. to 1000 degrees C. After that (between step S5' and step S6), the first plated layer 22 is formed on the ground layer 21 by plating. Next, the conductive resin layer 23 is formed on the first plated layer 22. After that, the second plated layer 24 and the third plated layer 25 are formed on the conductive resin layer 23 by electroplating or the like.

Figure 8:
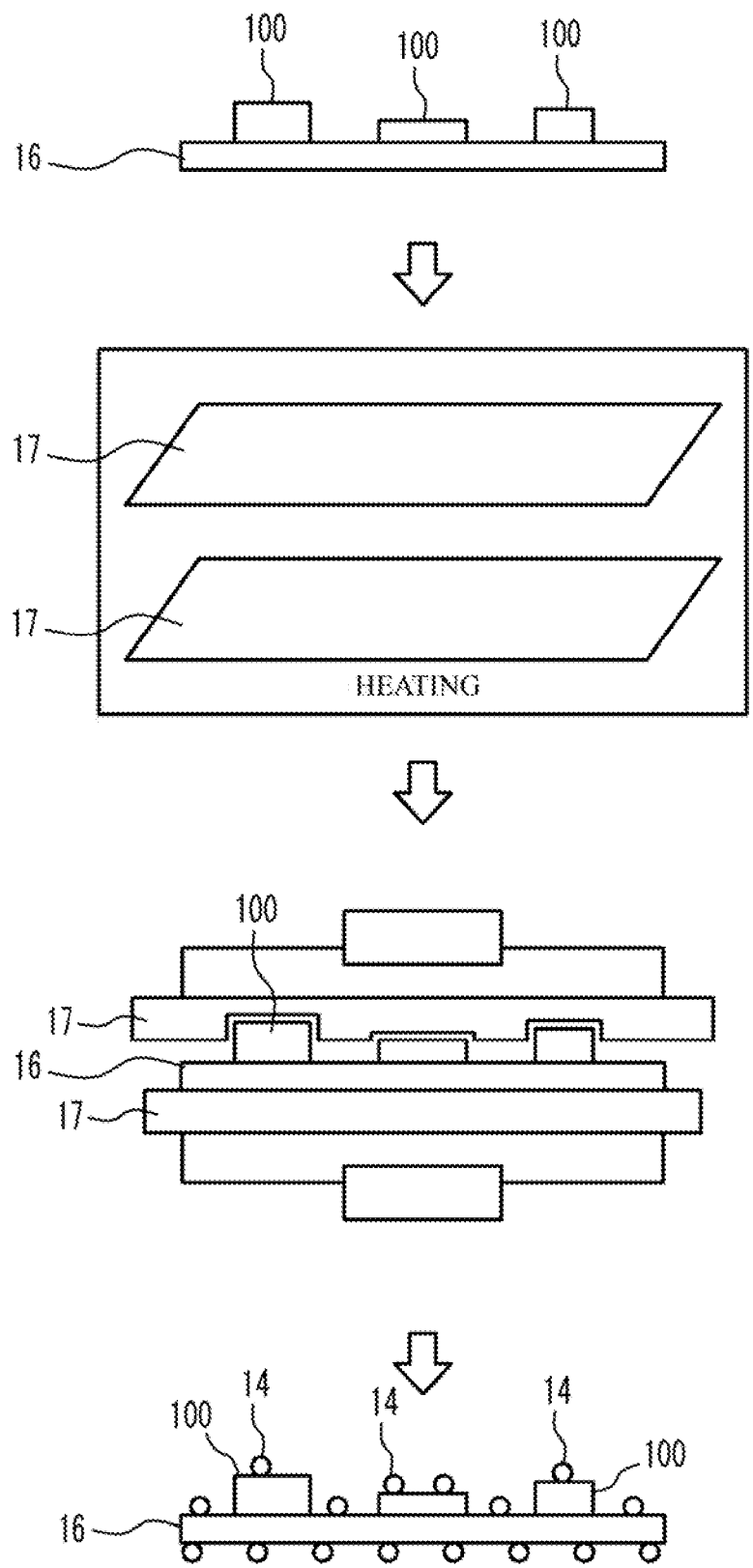
FIG. 8 illustrates a case where a fluorine sheet is pressed to a multilayer ceramic capacitor.

As illustrated in FIG. 8, the multilayer ceramic capacitors 100 may be mounted on a substrate 16 before bonding the fluorine compound 14 to the multilayer ceramic capacitors 100. A sheet 17 of the fluorine rubber may be heated and may be pressed to the multilayer ceramic capacitors 100. Thereby, the fluorine compound 14 may be adhered to at least a part of the region including the region of the surface of the multilayer chip 10 where the external electrode 20a or 20b is not provided and the surface of the external electrodes 20a and 20b. In this case, the fluorine compound 14 is adhered to the substrate 16. It is therefore possible to suppress breakdown caused by condensation on the surface of the substrate 16. It is possible to suppress defect of mounting, because the multilayer ceramic capacitors 100 are mounted before pressing the sheet 17 of the fluorine rubber to the multilayer ceramic capacitors 100. It is preferable that an apparent density of the sheet 17 of the fluorine rubber is 0.75 g/cm$^3$ or less. This is because, when the apparent density of the fluorine rubber is large, the sheet 17 is hardened. And, when the apparent density of the fluorine rubber is large and the sheet 17 is pressed to the multilayer ceramic capacitor 100, it is not possible to sufficiently cover the chips with the sheet 17. And, when the sheet 17 having a large apparent density is pressed so as to cover the chips, excessive force is applied to the chips and the chips may be damaged. The apparent density is mass of the sheet 17 with respect to the volume of the sheet 17.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Examples 1 to 4

An organic binder was kneaded with ceramic powder, of which a main component was barium titanate, having reduction resistant. Thus, slurry was prepared. The slurry was formed into a sheet by doctor blade. Thus, a dielectric green sheet was made. Metal conductive paste of Ni having a predetermined pattern was provided on the dielectric green sheet by screen printing. Thus, an internal electrode pattern was formed. The dielectric green sheet on which the internal electrode pattern was formed was stamped into a predetermined size. And a predetermined number of the dielectric green sheets were stacked. And a ceramic multilayer structure was made by thermos-compression.

Next, the ceramic multilayer structure was cut into predetermined chip sizes and was divided. Metal paste including a co-material was provided on the both end faces of the ceramic multilayer structure (faces exposed to external electrodes) by an immersion method so that the metal paste has a predetermined electrode width (E size).

Next, the resulting ceramic multilayer structure was fired at a 1250 degrees C. in nitrogen or hydrogen atmosphere and was subjected to a predetermined thermal treatment. Thus, the ground layer 21 covering the multilayer chip 10 and the both end faces of the multilayer chip 10. Next, the surface of the ground layer 21 was subjected to dry polishing with use of "whitemorundum" (registered trademark) as a polishing agent. After that, the first plated layer 22 was formed by Cu-plating. Next, conductive resin paste of which viscosity was adjusted to a predetermined value (10 to 30 Pa·s) was provided on the surface of the first plated layer 22 by an immersion method. Epoxy resin in which an Ag filler was kneaded was used as the conductive resin paste. After that, the conductive resin layer 23 was formed by hardening the conductive resin paste by a thermal treatment. And, the second plated layer 24 and the third plated layer 25 were formed on the conductive resin layer 23 by Ni-plating and Sn-plating. The resulting multilayer ceramic capacitor 100 had a length of 3.2 mm, a width of 2.5 mm and a height of 2.5 mm.

Fluorine rubber was heated together with the multilayer ceramic capacitor 100. And the fluorine rubber was contacted to the surface of the multilayer ceramic capacitor 100. Thus, the fluorine compound 14 was adhered to the surface of the multilayer ceramic capacitor 100. In the example 1, the heating temperature of the fluorine rubber was 150 degrees C. In the example 2, the heating temperature of the fluorine rubber was 170 degrees C. In the example 3, the heating temperature of the fluorine rubber was 190 degrees C. In the example 4, the heating temperature of the fluorine rubber was 210 degrees C.

In the comparative example, the fluorine compound 14 was not adhered (without water-repellent process).

With respect to the multilayer ceramic capacitors 100 of the examples 1 and 2, it was confirmed whether the fluorine compound was released. The multilayer ceramic capacitors 100 were heated from 60 degrees C. to 600 degrees C., and the component of the gas and the released amount from the mass of the released gas were analyzed, by gas chromatograph mass spectrometry: GC-MS (Gas Chromatography Mass Spectrometry) (EGA/Py-3030D made by Frontier Laboratories/GC7980A made by Agilent/JMS1050GC made by JEOL).

Analysis condition was as follows.
Thermal Decomposition Condition:
Thermal decomposition temperature was 60 degrees C. to 800 degrees C.
Temperature rising rate was 20 degrees C./min.
Column:
Column inner diameter was 0.25 mm.
Column length was 5 m.
Oven Temperature Condition:
Temperature range was 250 degrees C.
Holding time was 37 minutes.

Figure 9A:
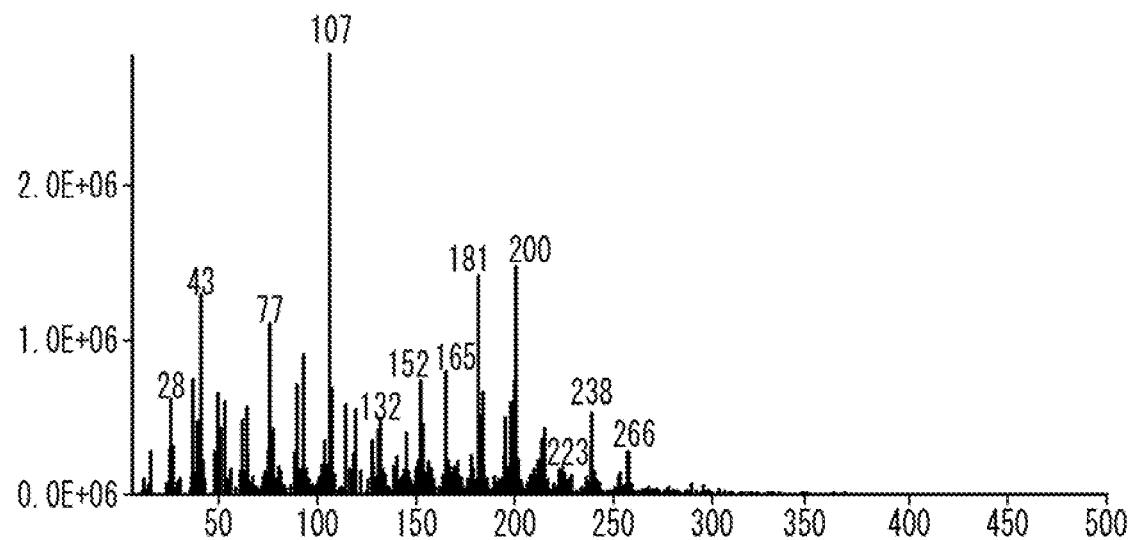
FIG. 9A illustrates a GC-MS analysis of an example 1.
Figure 9B:
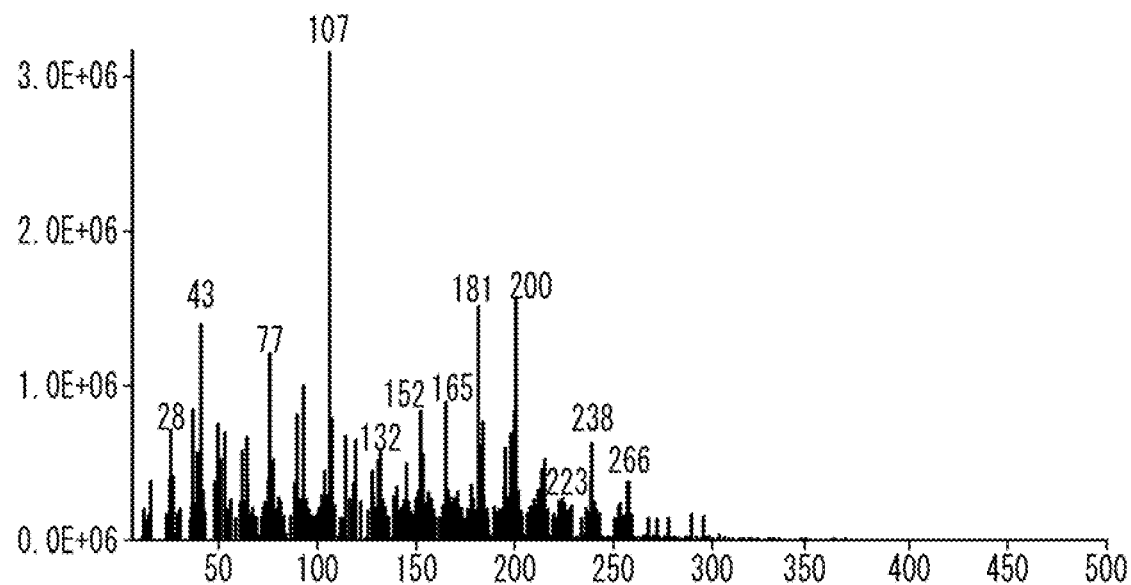
FIG. 9B illustrates a GC-MS analysis of an example 4.

FIG. 9A illustrates a GC-MS analysis result of the example 1. FIG. 9B illustrates a GC-MS analysis result of the example 4. In FIG. 9A and FIG. 9B, a horizontal axis indicates the mass to charge ratio (m/z value). A vertical axis indicates peak intensity. FIG. 9A and FIG. 9B illustrate results at a time when a heated temperature was 450 degrees C. As illustrated in FIG. 9A and FIG. 9B, releasing of fluorine of which M/z was 19 was confirmed at the time when the heated temperature was 450 degrees C.

Figure 10:
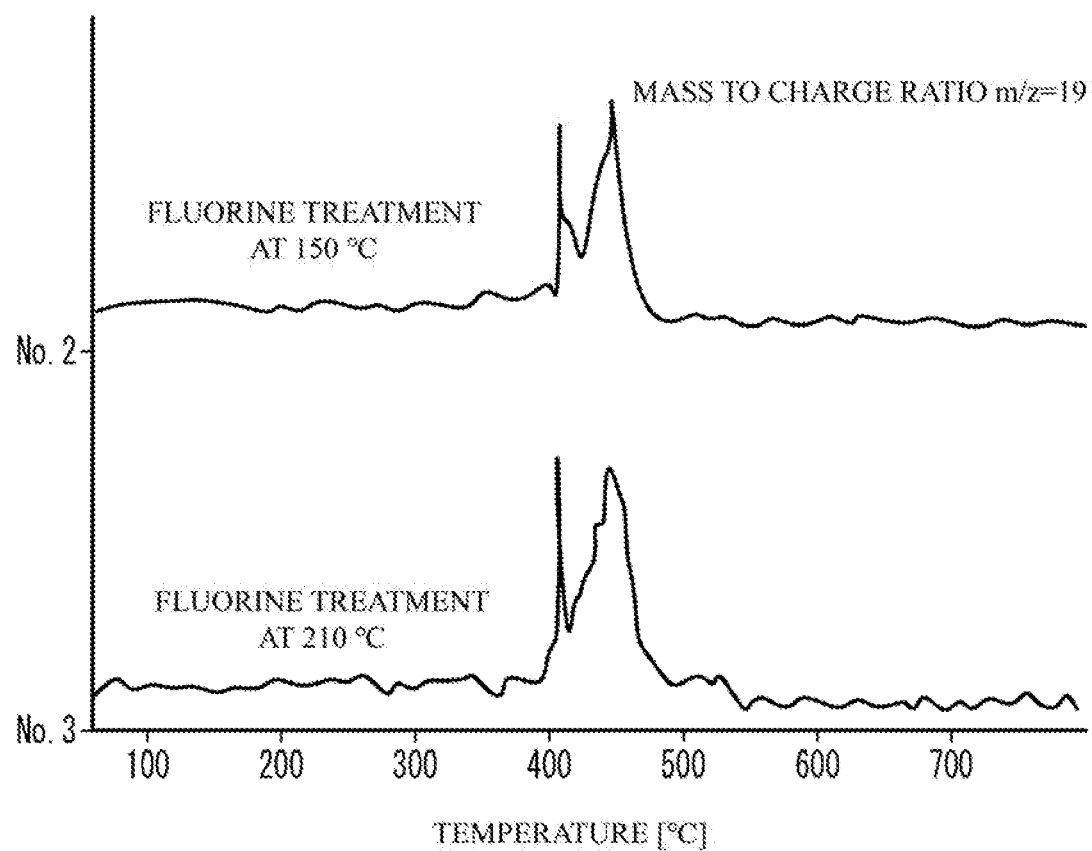
FIG. 10 illustrates an analysis result in which m/z is 19.

FIG. 10 focuses on m/z=19 in the GC-MS analysis results of the examples 1 and 4. A horizontal axis of FIG. 10 indicates a temperature. As illustrated in FIG. 10, in the examples 1 and 4, the releasing of the fluorine compound was not observed at a temperature less than 380 degrees C., and the releasing of the fluorine compound was observed at a high temperature of 380 degrees C. or more. It is thought that this was because the releasing of the fluorine compound was suppressed at a low temperature, because contact heating of the fluorine rubber was performed. In the results of FIG. 10, a peak of the released amount of the fluorine compound was observed at a temperature of 380 degrees C. or more.

Next, other 400 samples were subjected to a humidity resistance test, with respect to each of the examples 1 to 4 and the comparative example. In the humidity resistance test, each sample was left under a condition at a temperature of 120 degrees C. and at a relative humidity of 85%. And, a voltage of 1.5 times as much as a rated voltage was applied to each sample for 100 hours. And an electrical value (insulating resistance between electrodes) was measured. When the insulating resistance×a capacity was 100 MΩ·μF or more, it was determined as acceptance. When the insulating resistance×the capacity was less than 100 MΩ·μF, it was determined as non-acceptance. A ratio of samples determined as non-acceptance was measured with respect to 400 samples.

Next, other 400 samples were subjected to a condensation test, with respect to each of the examples 1 to 4 and the comparative example. The samples were mounted on reliable substrates (CEM 3). The samples were put in a thermo-hygrostat tank. And, 16 V was applied to the samples. A condensation test program of JIS 60068-2-30 was performed 6 times. After that, it was confirmed whether the migration occurred or not. The condition of each cycle of the program is as follows. (1) The humidity was kept at 98%. The temperature was changed from 25 degrees C. to 55 degrees C. for 3 hours. (2) The temperature was kept at 55 degrees C. The humidity was changed from 98% to 93% for 15 minutes. (3) The temperature was kept at 55 degrees C. and the humidity was kept at 93% for 9 hours and 25 minutes. (4) The humidity was kept at 93%. The temperature was changed from 55 degrees C. to 25 degrees C. for three hours. (5) The temperature was kept at 25 degrees C. and the humidity was kept at 93% for 3 hours. (6) The temperature was kept at 25 degrees C. The humidity was changed from 93% to 98% for 5 hours and 30 minutes. Each sample was observed by a stereomicroscope of 40 magnifications. And it was determined whether there was a precipitate between external electrodes. When there was a precipitate, it was determined that the migration occurred. A ratio of samples in which the migration occurred was measured with respect to 400 samples.

Table 1 shows the results of the humidity resistance test and the condensation test. As shown in Table 1, in the comparative example, the non-acceptance rate of the humidity resistance test was high. On the other hand, in the examples 1 to 4, the non-acceptance rate of the humidity resistance test was low. It is thought that this was because the water-repellent characteristic was achieved because the fluorine compound 14 was formed.

TABLE 1

|  | COMPARATIVE EXAMPLE | EXAMPLE 1 | EXAMPLE 2 | EXAMPLE 3 | EXAMPLE 4 |
| --- | --- | --- | --- | --- | --- |
| HUMIDITY RESISTANCE TEST | 7/400 | 0/400 | 0/400 | 0/400 | 0/400 |
| CONDENSATION TEST | 23/400 | 0/400 | 0/400 | 0/400 | 0/400 |

Next, non-acceptance rate of the condensation test of the comparative example was high. On the other hand, the non-acceptance rate of the condensation test was low in the examples 1 to 4. It is thought that this was because the water-repellent characteristic was achieved because the fluorine compound 14 was formed.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer chip in which each of a plurality of dielectric layers and each of a plurality of internal electrode layers are stacked, a main component of the dielectric layers being ceramic, the multilayer chip having a rectangular parallelepiped shape, respective one ends of the plurality of internal electrode layers being exposed to at least one of a first end face and a second end face of the multilayer structure, the first end face being opposite to the second end face;
   a first external electrode provided on the first end face;
   a second external electrode provided on the second end face; and
   a fluorine compound that is adhered to surfaces of the first external electrode and the second external electrode, the fluorine compound being released at a temperature of 380 degrees C. or more, but not released at a temperature less than 380 degrees C.,
   wherein a thickness of the fluorine compound on the surfaces of the first external electrode and the second external electrode is 1 nm to 80 nm,
   wherein solely the fluorine compound is adhered, as a fluorine compound, to the surfaces of the first external electrode and the second external electrode.

2. The multilayer ceramic capacitor as claimed in claim 1, wherein the fluorine compound is a compound of which a mass to charge ratio "m/z" is 19 in a GC-MS analysis.

3. The multilayer ceramic capacitor as claimed in claim 1, wherein there is a peak of a released amount of the fluorine compound, at a temperature of 380 degrees C. or more.

4. The multilayer ceramic capacitor as claimed in claim 1, wherein the fluorine compound is adhered to a surface of the multilayer chip between the first external electrode and the second external electrode.

5. The multilayer ceramic capacitor as claimed in claim 1, wherein the first external electrode and the second external electrode include a conductive resin layer including a metal component.

6. The multilayer ceramic capacitor as claimed in claim 5, wherein a thickness of the conductive resin layer is 10 μm or more and 50 μm or less.

7. The multilayer ceramic capacitor as claimed in claim 1, wherein the multilayer ceramic capacitor has a length of 1.0 mm or less, a width of 0.5 mm or less, and a height of 0.5 mm or less.

8. The multilayer ceramic capacitor as claimed in claim 1, wherein the multilayer ceramic capacitor has a length of 3.2 mm or less, a width of 1.6 mm or less, and a height of 1.6 mm or less.

9. The multilayer ceramic capacitor as claimed in claim 1, wherein the main component of the dielectric layers is $CaZrO_3$.

10. The multilayer ceramic capacitor as claimed in claim 1, wherein the main component of the dielectric layers is $Ba_{1-x-y}Ca_xSr_yTi_{1-z}Zr_zO_3$ ($0 \leq x \leq 1$, $0 \leq y \leq 1$, $0 \leq z \leq 1$).

11. The multilayer ceramic capacitor as claimed in claim 1, wherein a main component of the internal electrode layers is Ni.

12. The multilayer ceramic capacitor as claimed in claim 1, wherein a main component of the internal electrode layers is Cu.

13. The multilayer ceramic capacitor as claimed in claim 1,
   wherein each of the first external electrode and the second external electrode has a structure in which a plated layer is formed on a base layer, and
   wherein a main component of the base layer is Ni.

14. The multilayer ceramic capacitor as claimed in claim 1,
   wherein each of the first external electrode and the second external electrode has a structure in which a plated layer is formed on a base layer, and
   wherein a main component of the base layer is Cu.

15. The multilayer ceramic capacitor as claimed in claim 1, wherein the fluorine compound is adhered to at least a part of an upper face, a lower face and two side faces of the multilayer chip, between the first external electrode and the second external electrode,
   wherein the upper face and the lower face are edge faces of the multilayer chip in a stacking direction.

16. The multilayer ceramic capacitor as claimed in claim 1, wherein the fluorine compound covers a whole of surfaces of the multilayer ceramic capacitor.

17. The multilayer ceramic capacitor as claimed in claim 1, wherein a number of the internal electrode layers is 100 to 500.

* * * * *